(12) United States Patent
Widder

(10) Patent No.: US 7,995,217 B2
(45) Date of Patent: Aug. 9, 2011

(54) HIGH-RESOLUTION ENCODER ARRAY

(75) Inventor: John A. Widder, Washougal, WA (US)

(73) Assignee: STMicroelectronics, Inc., Coppell, TX (US)

(*) Notice: Subject to any disclaimer, the term of this patent is extended or adjusted under 35 U.S.C. 154(b) by 487 days.

(21) Appl. No.: 12/287,845

(22) Filed: Oct. 14, 2008

(65) Prior Publication Data

US 2009/0168077 A1    Jul. 2, 2009

Related U.S. Application Data

(60) Provisional application No. 61/009,746, filed on Dec. 31, 2007.

(51) Int. Cl.
*G01B 11/14* (2006.01)
*G06F 15/00* (2006.01)

(52) U.S. Cl. .......... 356/614; 702/150; 702/158

(58) Field of Classification Search ......... 356/614–623; 702/150, 158, 141–142; 250/231.16, 231.18
See application file for complete search history.

(56) References Cited

U.S. PATENT DOCUMENTS

| 4,811,229 A * | 3/1989 | Wilson ........... 701/25 |
| 7,428,283 B2 * | 9/2008 | Oh et al. ........ 375/355 |

* cited by examiner

*Primary Examiner* — Hoa Q Pham
(74) *Attorney, Agent, or Firm* — Lisa K. Jorgenson; William A. Munck

(57) ABSTRACT

A position sensing apparatus and method, motion control system, and integrated circuit are provided that include a plurality of sensors and a tracking processor. The plurality of sensors includes a linear array of sensors that sense a plurality of features of an object. A spacing between two of the plurality of sensors is substantially smaller than a spacing between two of the plurality of features. The tracking processor samples signals from the sensors, compares the samples to previous samples and calculates a position of the object. The plurality of sensors may include a second linear array of sensors. Centers of the sensors of the second linear array may be offset from centers of the sensors of the first linear array along a longitudinal axis of the plurality of sensors.

28 Claims, 4 Drawing Sheets

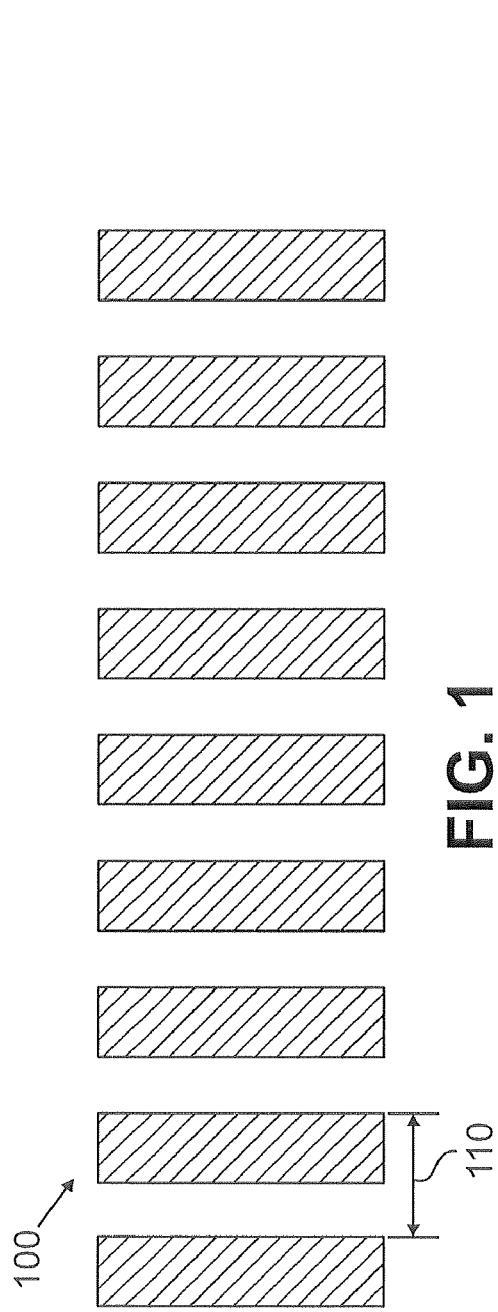
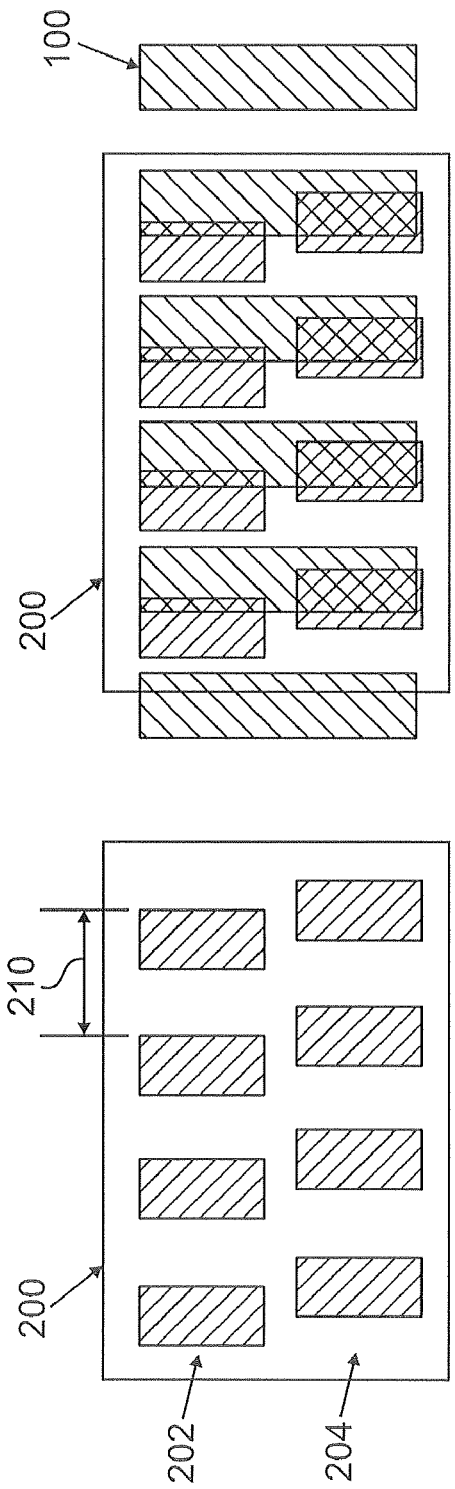

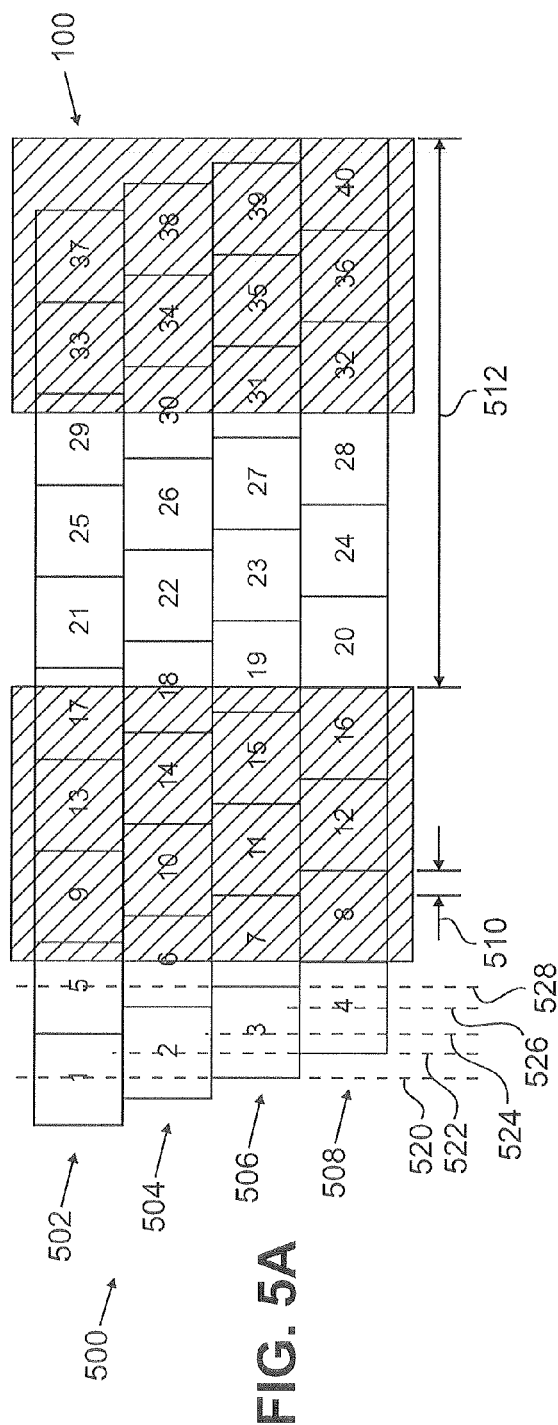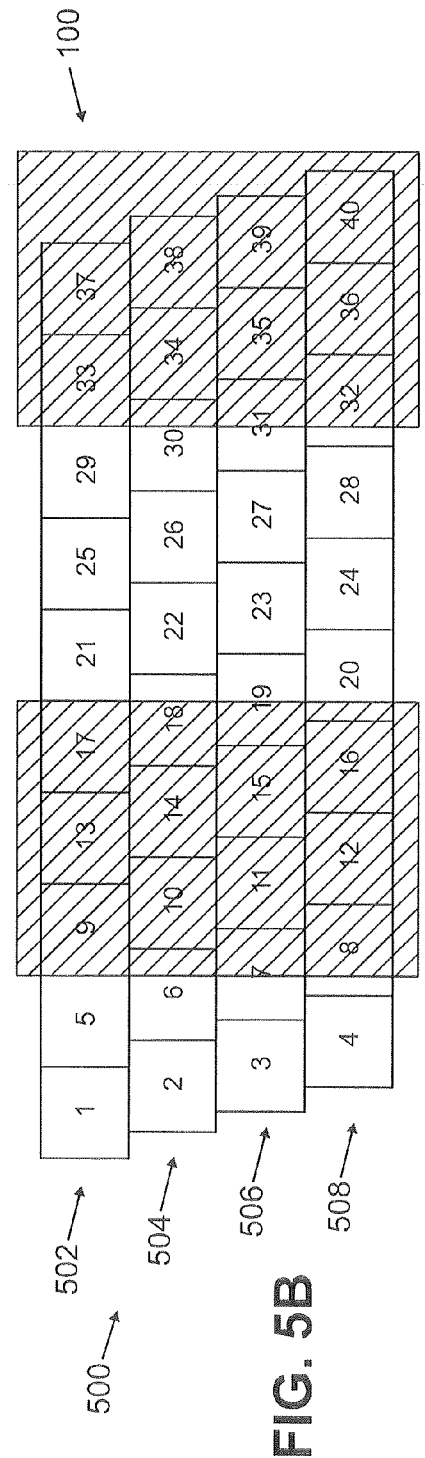
FIG. 5A
FIG. 5B

HIGH-RESOLUTION ENCODER ARRAY

CROSS-REFERENCE TO RELATED APPLICATION AND CLAIM OF PRIORITY

The present application is related to Provisional Patent Application No. 61/009,746 filed Dec. 31, 2007, entitled "HIGH-RESOLUTION ENCODER ARRAY". Provisional Patent No. 61/009,746 is assigned to the assignee of the present application and is hereby incorporated by reference into the present application as if fully set forth herein. The present application hereby claims priority under 35 U.S.C. §119(e) to U.S. Provisional Patent No. 61/009,746.

TECHNICAL FIELD

The present disclosure relates generally to position encoding. In particular, the disclosure relates to a high resolution position encoder.

BACKGROUND

Many applications have a need to measure position with high resolution and accuracy, but at a low cost. One example of such an application is paper motion control in inkjet printers. The spacing between nozzles in an inkjet printer is very fine—typically 1/600" (about 1.6 mils, or 42 microns). In order to prevent visible banding when printing graphic images, the linefeed error must be significantly less than the distance between adjacent nozzles. An inkjet printer typically uses a DC servo system for motion control, with an incremental optical encoder for position feedback.

Typically, position measurement solutions require a trade-off among the factors such as resolution, cost and computing overhead. Low resolution physical components may be used and computing overhead kept low by utilizing additional circuitry, thereby increasing overall system cost. Alternatively, more costly high resolution physical components may be used, obviating the need for additional circuitry while keeping computing overhead low. In yet another solution, low resolution physical components and minimal additional circuitry may be used, resulting in higher computation overhead.

As such, there is a need for an apparatus and method for measuring position with a high resolution and accuracy. In particular, there is a need for position measurement with high resolution and accuracy, at relatively low cost, with minimal computational overhead in a system employing such a measurement apparatus.

SUMMARY

This disclosure provides an apparatus for motion sensing that measures position with high resolution and accuracy at relatively low cost. A system for motion control employing the apparatus and method of controlling motion as disclosed require minimal additional computational overhead for purposes of motion sensing.

In one embodiment, the present disclosure provides a position sensing apparatus that includes a plurality of sensors and a tracking processor. The plurality of sensors includes a linear array of sensors that are capable of sensing a plurality of features of an object. A spacing between two of the plurality of sensors is substantially smaller than a spacing between two of the plurality of features. The tracking processor is coupled to the sensors and is capable of sampling signals from the sensors, comparing the sampled signals to previously sampled signals, and calculating a position of the object based upon the comparison.

In another embodiment, this disclosure provides a motion control system that includes a motor, a motion controller, a plurality of sensors, and a tracking processor. The motor is capable of moving an object and the motion controller is coupled to the motor and capable of controlling a motion of the motor. The plurality of sensors includes a linear array of sensors that are capable of sensing a plurality of features of the object. A spacing between two of the plurality of sensors is substantially smaller than a spacing between two of the plurality of features. The tracking processor is coupled to the sensors and is capable of sampling signals from the sensors, comparing the sampled signals to previously sampled signals, calculating a position of the object based upon the comparison, and transmitting the position to the motion controller. The motion controller is further capable of controlling the motion of the object in accordance with the transmitted position.

In yet another embodiment, the present disclosure provides a method of controlling motion. The method includes the step of sensing a plurality of features of an object with a plurality of sensors. The plurality of sensors includes a linear array of sensors and a spacing between two of the plurality of sensors is substantially smaller than a spacing between two of the plurality of features. The method also includes sampling signals from the plurality of sensors and comparing the samples to previously sampled signals. The method further includes calculating a position of the object based upon the comparison and controlling the motion of the object based upon the calculated position.

In another embodiment, this disclosure provides an integrated circuit that includes a plurality of sensors and a tracking processor. The plurality of sensors includes a linear array of sensors that are capable of sensing a plurality of features of an object. A spacing between two of the plurality of sensors is substantially smaller than a spacing between two of the plurality of features. The tracking processor is coupled to the sensors and is capable of sampling signals from the sensors, comparing the sampled signals to previously sampled signals, and calculating a position of the object based upon the comparison.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which:

FIG. 1 depicts a code strip for use with an incremental optical encoder;

FIG. 2A shows a conventional photodiode layout on an optical detector;

FIG. 2B illustrates a portion of the code strip of FIG. 1 overlying the optical detector of FIG. 2A;

FIG. 5A depicts a high resolution sensor array according to the present disclosure with an overlying code strip such as in FIG. 1;

FIG. 5B depicts the high resolution sensor array and code strip of FIG. 5A where the code strip has moved to the right;

DETAILED DESCRIPTION

Figure 3:
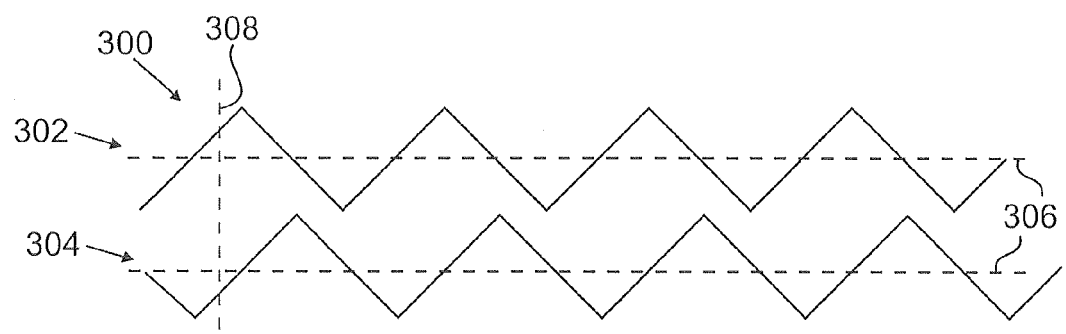
FIG. 3 depicts analog signal outputs from the optical detector of FIG. 2A as the code strip of FIG. 1 passes over the photodiodes.

Some embodiments of the present disclosure provide an apparatus and method for sensing motion using a high resolution encoder that measures position with high resolution and accuracy, at relatively low cost, with minimal computational overhead in a system employing such an apparatus.

FIG. 1 depicts a code strip 100 for use with an incremental optical encoder. A conventional position encoder will employ an optical detector 200 with a conventional layout of photodiodes 202 and 204 as shown in FIG. 2A. Typically, the lines of the code strip 100 are spaced with an equal distance 110 between lines. Similarly, the photodiodes 202 and 204 are typically spaced with an equal distance 210 between photodiodes, where distance 210 equals distance 110.

The code strip 100 may be most suited to measuring linear motion. For measuring rotary motion, a similar pattern of radial lines may be fabricated near the outer edge of a code wheel. Where the circumference of such a wheel is large in relation to the length of the photodiodes 202 and 204, the effect on position measurement of the lines of such a code wheel being non-parallel may be negligible.

Where the lines of code strip 100 are opaque lines on a clear substrate, a light source (such as an LED) may be placed on a side of the code strip 100 opposite the optical detector 200. In this way, the clear substrate of the code strip 100 permits light from the light source to reach the photodiodes 202 and 204 of the optical detector 200 and a line of the code strip 100 interferes with light reaching the photodiodes 202 and 204.

In the alternative, the code strip 100 may be made up of reflective lines on a non-reflective substrate or non-reflective lines on a reflective substrate. With such a code strip 100, the light source may be positioned on the same side of the code strip 100 as the optical detector, such that the photodiodes 202 and 204 receive light reflected from a reflective line and receive no light from the non-reflective substrate. In either case, signals from the photodiodes 202 and 204 may be interpreted to determine a position of the code strip 100 relative to the optical detector 200 and motion of the code strip 100 relative to the optical detector 200.

Typically, the photodiodes 202 and 204 are staggered relative to each other, in order to produce signals that are 90 degrees out of phase with each other. This allows a direction of motion of the code strip 100 relative to the optical detector 200 to be determined. As shown in FIG. 2B, the code strip 100 may reach a position where the lines cover approximately 75% of the photodiodes 204 and approximately 25% of the photodiodes 202. Where the photodiodes 202 and 204 produce an output signal linearly proportional to the amount of light they receive and the lines of the code strip 100 are opaque, and thus prevent light reaching the photodiodes 202 and 204, the photodiodes 202 and 204 will produce about 75% and 25% of a full output signal, respectively.

FIG. 3 depicts analog signal outputs 300 from the optical detector 200 of FIG. 2A as the code strip 100 of FIG. 1 passes over the photodiodes 202 and 204. Signals from photodiodes 202 may be combined into the single signal 302 and signals from photodiodes 204 may be combined into the single signal 304. Where the lines of the code strip 100 are opaque, the signals 302 and 304 begin on the left side with all of the photodiodes 202 covered and half of the photodiodes 204 covered, resulting in no signal from the photodiodes 202 and about a 50% signal from the photodiodes 204.

Figure 4:
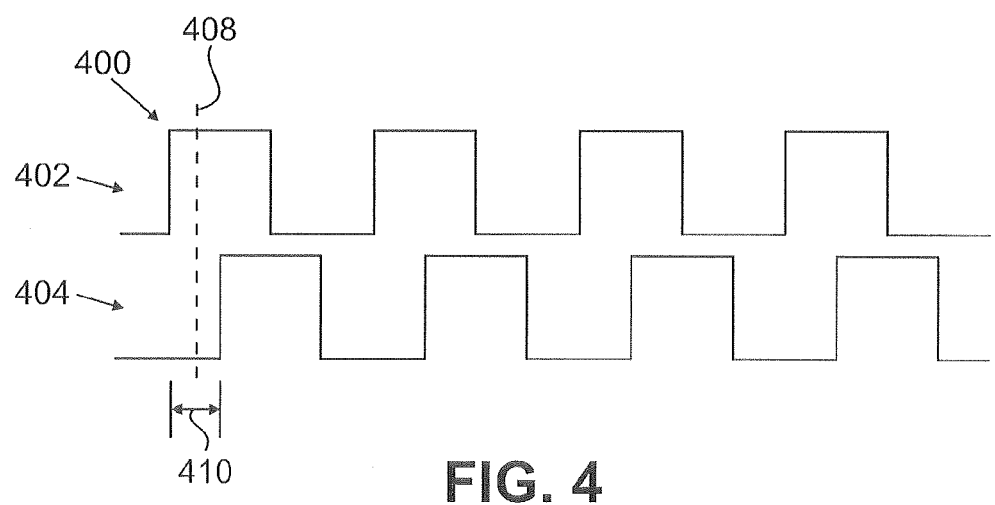
FIG. 4 shows binary signals quantized from the analog signals of FIG. 3.

As the code strip 100 moves to the right, progressively more of the photodiodes 202 are uncovered and progressively more of the photodiodes 204 are covered, causing signal 302 to increase in value and signal 304 to decrease in value until all of photodiodes 204 are covered and about half of the photodiodes 202 are uncovered. As the code strip 100 continues to move to the right it reaches the position relative to optical encoder 200 shown in FIG. 2B, at which point the signals 302 and 304 that result are indicated by line 308 in FIG. 3. The remainder of FIG. 3 shows the signals 302 and 304 that result as the code strip 100 continues to move to the right relative to the optical encoder 200.

Where the signals 302 and 304 are quantized into binary values binary signal outputs 400 of FIG. 4 may be the result. It may be seen that when signals 302 and 304 are quantized at the threshold levels indicated by lines 306 in FIG. 3, signals 402 and 404 may result. Line 408 indicates the state of the signals 402 and 404 when the code strip 100 is in the position relative to the optical encoder 200 shown in FIG. 2B.

A system measuring position using the signals 402 and 404 receives new information about the position of the code strip 100 relative to the optical encoder 200 whenever either signal 402 or 404 changes state. Thus, the resolution of such a system is distance 410, approximately one-quarter of distances 110 and 210 in FIGS. 1 and 2A, respectively.

Better resolution may be obtained by fabricating code strip 100 with finer, more closely spaced, lines (and optical encoder 200 with correspondingly thinner and more closely spaced photodiodes). However, such code strips may cost more to fabricate, be subject to damage, or be more sensitive to dirt or ink on the strip covering spaces between lines. A code wheel may be made with a larger diameter, with the result that lines of the same size and pitch placed farther from the axis of rotation subtend smaller arcs of rotation, providing higher resolution as a result. However, package size imposes an upper limit on code wheel size.

Better resolution may alternatively be obtained by digitizing and interpolating the analog signals 302, to obtain a measurement of the position of the code strip 100 relative to the optical encoder 200. While such a solution provides better resolution, it also requires additional circuitry to digitize the signals and processing power to interpolate the positions, raising the cost of such a position measurement system. Furthermore, analog to digital conversion may require current-to-voltage circuitry. Outputs of the optical encoder 200 may vary in amplitude and offset and require calibration as a result of encoder manufacturing processes, encoder age, temperature, contamination from environmental debris, and non-linear outputs.

FIG. 5A depicts a high resolution sensor array 500 according to the present disclosure with an overlying code strip 100 such as shown in FIG. 1. The encoder 500 may include linear arrays 502, 504, 506 and 508 of sensors. Linear array 502 may include sensors 1, 5, 9, 13 . . . 37; linear array 504 may include sensors 2, 6, 10, 14 . . . 38; linear array 506 may include sensors 3, 7, 11, 15 . . . 39; and linear array 508 may include sensors 4, 8, 12, 16 . . . 40.

Longitudinal axes of the arrays 502, 504, 506 and 508 may be parallel to each other and to a longitudinal axis of the sensor array 500. The array 502 may be adjacent to the array 504, which may be adjacent to array 506, which may be adjacent to array 508. The sensors 1-40 may be about the same size. A center line 522 of the sensor 2 is perpendicular to the longitudinal axis of the array 504. The center line 522 may be offset along the longitudinal axis of the array 504 from a similar, perpendicular center line 520 of the sensor 1 by about one-quarter a length of the sensors. Similarly, a center line 524 of the sensor 3 may be offset about the same distance from the center line 522 and a center line 526 of the sensor 4 may be offset about the same distance from the center line 524. As a result, a center line 528 of the sensor 5, which is immediately adjacent to the sensor 1 in the array 502, may be offset from the center line 526 about one-quarter the length of the sensors.

As arranged, the sensors of the arrays 502, 504, 506 and 508 may be considered to form a single linear array of sensors, numbered 1-40. While the code strip 100 has a resolution of distance 512, the sensor array 500 has a resolution of distance 510, one-quarter the length of an individual sensor.

In array 502, a distance between the center line 520 of the sensor 1 and the center line 528 of the sensor 5 may be substantially smaller than the distance 512 between the lines of the code strip 100. In other embodiments, the sensors 1-40 of the sensor array 500 may be spaced apart, rather than being immediately adjacent as shown in FIG. 5A, while remaining substantially closer together than the distance 512 between the lines of the code strip 100.

As a operational example, consider the situation shown in FIG. 5A and assume that the output signals of the sensors 1-40 are converted to a value "1" if one-half or less of a sensor is covered by a line of the code strip 100 and to a value of "0" if more than one-half of a sensor is covered. The converted values of the sensors 1-40 as shown in FIG. 5A may then be as shown in Table 1:

array 500. Indeed, the sensor array 500 may sense and resolve movement of an object having a wide range of line widths, pitches and orientations. The sensor array 500 may also sense the movement of objects having irregular features or objects having a texture, rather than a defined pattern of lines. The sensor array 500 may sense the movement of objects that transmit light or objects that reflect light.

Improved resolution from the sensor array 500 may be obtained by digitizing and interpolating the output signals of the sensors 1-40. For example, in another embodiment of the present disclosure, the output signals of the sensors 1-40 may be digitized to eight or sixteen values that are linearly proportional to the amount of light reaching the sensor. In this way, the resolution of the sensor array 500 might be reduced to one-half or one-quarter of the distance 510, respectively.

In yet another embodiment of the disclosure, a single linear array of sensors, such as linear array 502, may be employed, with the sensor outputs digitized to four values. Such a sensor array may have a resolution of distance 510 with one-quarter the number of sensors of the sensor array 500.

The multiple, staggered linear arrays 502, 504, 506 and 508 of the sensor array 500 may provide reliability and fail-soft operation. In an embodiment of the present disclosure where the output signals of the sensors 1-40 are digitized to four values, the sensor array 500 may be fully operational, even where a sensor has failed. For example, should the sensor 7 fail, the signals from the sensors 4-6 and 8-10 may allow a position measurement system using the sensor array 500 to continue to measure the position of the code strip 100 with a resolution of distance 510 at all positions along the sensor array 500.

TABLE 1

| Sensor | | | | | | | | | | | | | | | | | | | |
|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 |
| Value | | | | | | | | | | | | | | | | | | | |
| 1 | 1 | 1 | 1 | 1 | 1 | 0 | 0 | 0 | 0 | 0 | 0 | 0 | 0 | 0 | 0 | 0 | 1 | 1 | 1 |

| Sensor | | | | | | | | | | | | | | | | | | | |
|---|---|---|---|---|---|---|---|---|---|---|---|---|---|---|---|---|---|---|---|
| 21 | 22 | 23 | 24 | 25 | 26 | 27 | 28 | 29 | 30 | 31 | 32 | 33 | 34 | 35 | 36 | 37 | 38 | 39 | 40 |
| Value | | | | | | | | | | | | | | | | | | | |
| 1 | 1 | 1 | 1 | 1 | 1 | 1 | 1 | 1 | 1 | 0 | 0 | 0 | 0 | 0 | 0 | 0 | 0 | 0 | 0 |

Figure 6:
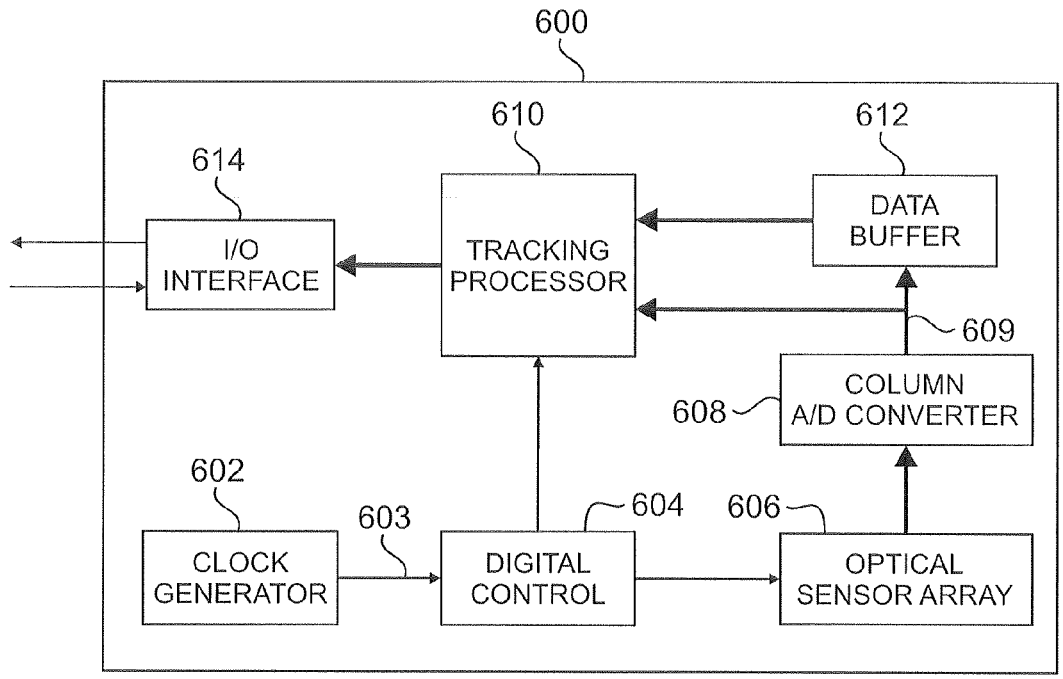
FIG. 6 shows a position measurement system according to the present disclosure.

FIG. 5B depicts the high resolution sensor array 500 and code strip 100 of FIG. 5A, where the code strip has moved to the right by the distance 510. The converted values of the sensors 1-40 as shown in FIG. 5A may then be as shown in Table 2:

FIG. 6 shows a position measurement system 600 according to the present disclosure. The position measurement system 600 may be a system-on-a-chip, that is, all the elements of position measurement system 600 may be fabricated on a single integrated circuit. For example all elements of the

TABLE 2

| Sensor | | | | | | | | | | | | | | | | | | | |
|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 |
| Value | | | | | | | | | | | | | | | | | | | |
| 1 | 1 | 1 | 1 | 1 | 1 | 1 | 0 | 0 | 0 | 0 | 0 | 0 | 0 | 0 | 0 | 0 | 0 | 1 | 1 |

| Sensor | | | | | | | | | | | | | | | | | | | |
|---|---|---|---|---|---|---|---|---|---|---|---|---|---|---|---|---|---|---|---|
| 21 | 22 | 23 | 24 | 25 | 26 | 27 | 28 | 29 | 30 | 31 | 32 | 33 | 34 | 35 | 36 | 37 | 38 | 39 | 40 |
| Value | | | | | | | | | | | | | | | | | | | |
| 1 | 1 | 1 | 1 | 1 | 1 | 1 | 1 | 1 | 1 | 1 | 0 | 0 | 0 | 0 | 0 | 0 | 0 | 0 | 0 |

It may be seen by comparing Tables 1 and 2 that the sensor array 500 may resolve a movement by the code strip 100 of a distance of length 510. It may also be seen that the resolution of the sensor array 500 depends not upon characteristics of the code strip 100, but rather upon characteristics of the sensor system 600 may be fabricated using CMOS semiconductor processing techniques. A clock 602 may provide a clock signal 603 to a digital control circuit 604 that may control the operation of an optical sensor array 606, a tracking processor 610, and other circuitry of the system 600. In another embodiment of the present disclosure, the clock signal 603 may be provided by external circuitry utilizing the position measurement system 600.

The optical sensor array 606, such as sensor array 500, may sense a position of a moving object, such as code strip 100. Signals from the sensor array 606 may be converted by A/D convertors 608 into converted signals 609. The converted signals 609 may be stored in a data buffer 612 for later use as well as being sampled by the tracking processor 610 for immediate use. The tracking processor 610 may also read previously sampled signals from the data buffer 612. The tracking processor 610 may calculate one or more characteristics of the position and motion of the moving object sensed by the sensor array 606 and may signal those characteristics to external circuitry via an I/O interface 614. The tracking processor may also receive control signals from external circuitry via the I/O interface 614.

In an operational example, the tracking processor 610 may receive one or more control signals from external circuitry via the I/O interface 614 indicating that the current position of the moving object is to be represented as position value zero, that movement of a distance of one-quarter sensor length is to be represented as a change of one unit, and that movement in a first direction changes the position value in a positive direction, while movement in the opposite direction changes the position value in a negative direction.

Based upon clock signals from the clock generator 602, the digital control circuit 604 may periodically cause the optical sensor array 606 to sense the position of the moving object and the A/D convertor 608 to convert signals from the array 606 into the converted signals 609. The tracking processor 610 may sample the converted signals 609 and compare them to previous converted signals stored in the data buffer 612. If there is a change in the converted signals 609 from the stored previous signals, the tracking processor may calculate a direction and distance in which the moving object has moved and update the current position of the moving object.

The tracking processor 610 may also determine an amount of time between the current and previously sensed positions and, from the distance, direction and time information, calculate a velocity of the moving object. The tracking processor 610 may further compare this velocity with a previously calculated velocity, or compare the current and previously sensed positions with a second previously sensed position, in order to calculate an acceleration for the moving object. One or more of these calculated characteristics of the moving object's motion may be transmitted to circuitry external to the position measurement system 600 by way of the I/O interface 614.

Figure 7:
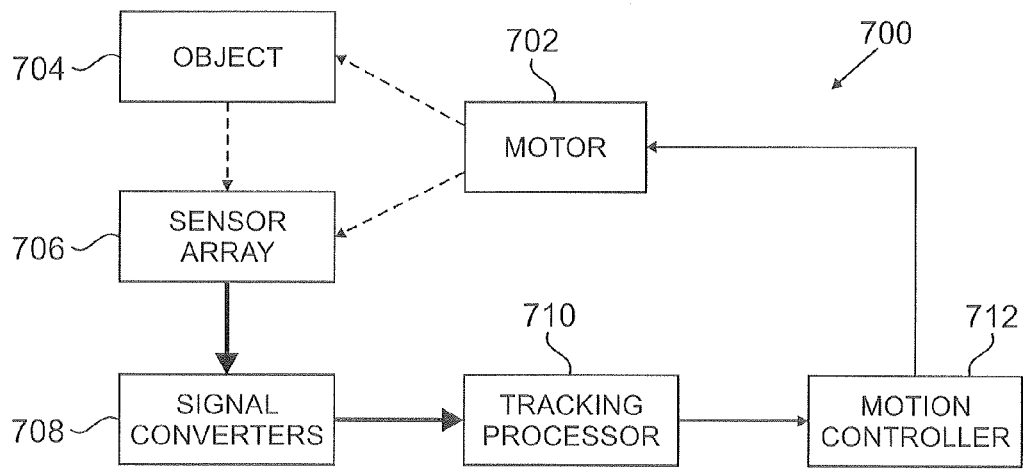
FIG. 7 illustrates a motion control system according to the present disclosure.

FIG. 7 illustrates a motion control system 700 according to the present disclosure. A motor 702 may move either an object 704 or a sensor array 706 relative to the other of the two elements. The sensor array 706 may sense a characteristic of the object 704. A plurality of signal convertors 708 may convert signals from the sensor array 706 into converted signals. A tracking processor 710 may sample and store converted signals, compare the sampled signals with previously sampled signals, and calculate one or more characteristics of the motion of the object 704 relative to the sensor array 706. The tracking processor 710 may then transmit the calculated characteristics to a motion controller 712, which may use the transmitted characteristics to control the motor 702, in order to produce a desired motion in the object 704 or the sensor array 706.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The term "controller" means any device, system or part thereof that controls at least one operation; the term "processor" means any device, system or part thereof that processes signals, information or data. Such devices may be implemented in hardware or in firmware or software executing on hardware. It should be noted that the functionality associated with any particular controller or processor may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A position sensing apparatus, comprising:
   a plurality of sensors, comprising a linear array of sensors, the sensors capable of sensing a plurality of features of an object, wherein a spacing between two of the plurality of sensors is substantially smaller than a spacing between two of the plurality of features; and
   a tracking processor coupled to the plurality of sensors, the tracking processor capable of
      sampling signals from the plurality of sensors,
      comparing the sampled signals to previously sampled signals from the plurality of sensors, and
      calculating a position of the object based upon the comparison.

2. The apparatus of claim 1, wherein the plurality of sensors further comprises a second linear array of sensors.

3. The apparatus of claim 2, wherein centers of the sensors of the second linear array are offset from centers of the sensors of the first linear array along a longitudinal axis of the plurality of sensors.

4. The apparatus of claim 3, wherein the tracking processor is further capable of arranging the sampled signals according to relative positions of the centers of the sensors of the first and second linear arrays along the longitudinal axis of the plurality of sensors.

5. The apparatus of claim 1, further comprising a plurality of signal convertors coupled to the plurality of sensors and to the tracking processor,
   wherein each of the plurality of signal convertors is coupled to one of the plurality of sensors and is capable of converting a signal from the sensor into a converted signal having one of a plurality of values.

6. The apparatus of claim 1, wherein the tracking processor is further capable of calculating one of a velocity and an acceleration of the object.

7. The apparatus of claim 1, wherein the sensors sense one of light transmitted through the object and light reflected from the object.

8. A motion control system, comprising:
 a motor capable of moving an object;
 a motion controller, coupled to the motor and capable of controlling a motion of the motor;
 a plurality of sensors, comprising a linear array of sensors, the sensors capable of sensing a plurality of features of the object, wherein a spacing between two of the plurality of sensors is substantially smaller than a spacing between two of the plurality of features; and
 a tracking processor coupled to the plurality of sensors and to the motion controller, the tracking processor capable of
  sampling signals from the plurality of sensors,
  comparing the sampled signals to previously sampled signals of the plurality of sensors,
  calculating a position of the object based upon the comparison, and
  transmitting the calculated position to the motion controller,
 wherein the motion controller is further capable of controlling the motion of the object in accordance with the transmitted position.

9. The system of claim 8, wherein the plurality of sensors further comprises a second linear array of sensors.

10. The system of claim 9, wherein centers of the sensors of the second linear array are offset from centers of the sensors of the first linear array along a longitudinal axis of the plurality of sensors.

11. The system of claim 10, wherein the tracking processor is further capable of arranging the sampled signals according to relative positions of the centers of the sensors of the first and second linear arrays along the longitudinal axis of the plurality of sensors.

12. The system of claim 8, further comprising a plurality of signal convertors coupled to the plurality of sensors and to the tracking processor,
 wherein each of the plurality of signal convertors is coupled to one of the plurality of sensors and is capable of converting a signal from the sensor into a converted signal having one of a plurality of values.

13. The system of claim 8, wherein the tracking processor is further capable of calculating one of a velocity and an acceleration of the object.

14. The system of claim 8, wherein the sensors sense one of light transmitted through the object and light reflected from the object.

15. A method of controlling motion, comprising:
 sensing a plurality of features of an object with a plurality of sensors comprising a linear array of sensors, wherein a spacing between two of the plurality of sensors is substantially smaller than a spacing between two of the plurality of features;
 sampling signals from the plurality of sensors;
 comparing the sampled signals to previously sampled signals from the plurality of sensors;
 calculating a position of the object based upon the comparison; and
 controlling a motion of the object based upon the calculated position.

16. The method of claim 15, wherein the plurality of sensors further comprises a second linear array of sensors.

17. The method of claim 16, wherein centers of the sensors of the second linear array are offset from centers of the sensors of the first linear array along a longitudinal axis of the plurality of sensors.

18. The method of claim 17, further comprising arranging the sampled signals according to relative positions of the centers of the sensors of the first and second linear arrays along a longitudinal axis of the plurality of sensors.

19. The method of claim 15, further comprising, for each of the plurality of sensors, converting a signal from the sensor into a converted signal having one of a plurality of values.

20. The method of claim 15, further comprising calculating one of a velocity and an acceleration of the object.

21. The method of claim 15, wherein sensing a characteristic of an object further comprises sensing one of light transmitted through the object and light reflected from the object.

22. An integrated circuit, comprising:
 a plurality of sensors, comprising a linear array of sensors, the sensors capable of sensing a plurality of features of the object, wherein a spacing between two of the plurality of sensors is substantially smaller than a spacing between two of the plurality of features; and
 a tracking processor coupled to the plurality of sensors, the processor capable of
  sampling signals from the plurality of sensors,
  comparing the sampled signals to previously sampled signals from the plurality of sensors, and
  calculating a position of the object based upon the comparison.

23. The integrated circuit of claim 22, wherein the plurality of sensors further comprises a second linear array of sensors.

24. The integrated circuit of claim 23, wherein centers of the sensors of the second linear array are offset from centers of the sensors of the first linear array along a longitudinal axis of the plurality of sensors.

25. The integrated circuit of claim 24, wherein the tracking processor is further capable of arranging the sampled signals according to relative positions of the centers of the sensors of the first and second linear arrays along a longitudinal axis of the plurality of sensors.

26. The integrated circuit of claim 22, further comprising a plurality of signal convertors coupled to the plurality of sensors and to the tracking processor,
 wherein each of the plurality of signal convertors is coupled to one of the plurality of sensors and is capable of converting a signal from the sensor into a converted signal having one of a plurality of values.

27. The integrated circuit of claim 22, wherein the tracking processor is further capable of calculating one of a velocity and an acceleration of the object.

28. The apparatus of claim 22, wherein the sensors sense one of light transmitted through the object and light reflected from the object.

* * * * *